United States Patent [19]

White

[11] Patent Number: 5,014,154
[45] Date of Patent: May 7, 1991

[54] ELECTRICAL SAFETY DEVICE
[75] Inventor: David B. White, Greenock, Pa.
[73] Assignee: United States Department of Energy, Washington, D.C.
[21] Appl. No.: 578,155
[22] Filed: Sep. 6, 1990
[51] Int. Cl.[5] ............................................. H02H 3/16
[52] U.S. Cl. ...................................... 361/49; 361/50; 340/650
[58] Field of Search .......................... 361/42, 49, 50; 340/650

[56] References Cited
U.S. PATENT DOCUMENTS

| | | |
|---|---|---|
| 2,747,154 | 5/1956 | Abrams . |
| 3,171,062 | 2/1965 | Rowe, Jr. . |
| 3,242,382 | 3/1966 | Rogers, Sr. . |
| 3,450,947 | 6/1969 | Rogers, Sr. . |
| 4,028,594 | 6/1977 | Schossow . |
| 4,089,031 | 3/1978 | Stevens ................................ 361/50 |
| 4,224,652 | 9/1980 | Fiorentzis . |
| 4,722,121 | 1/1988 | Hornung et al. . |

Primary Examiner—Todd E. DeBoer
Attorney, Agent, or Firm—Judy K. Kosovich; William R. Moser; R. E. Constant

[57] ABSTRACT

An electrical safety device for use in power tools that is designed to automatically discontinue operation of the power tool upon physical contact of the tool with a concealed conductive material. A step down transformer is used to supply the operating power for a disconnect relay and a reset relay. When physical contact is made between the power tool and the conductive material, an electrical circuit through the disconnect relay is completed and the operation of the power tool is automatically interrupted. Once the contact between the tool and conductive material is broken, the power tool can be quickly and easily reactivated by a reset push button activating the reset relay. A remote reset is provided for convenience and efficiency of operation.

5 Claims, 1 Drawing Sheet

ELECTRICAL SAFETY DEVICE

The U.S. Government has rights in this invention pursuant to Contract No. DE-AC11-76PN00014, awarded by the U.S. Department of Energy.

BACKGROUND OF THE INVENTION

The present invention relates to electrical safety circuits utilized in power tools and, more particularly, to an electrical safety device which has a disconnect relay that is energized when the power tool makes contact with a conductive material. The present invention also has a reset relay that is energized by a push button allowing the power tool to be quickly reactivated once there is no longer any contact between the power tool and the conductive material.

In modern construction, it is often necessary to provide access to power and communication lines that may be housed in metal raceways, pipes or other conductive materials found beneath floors constructed of various materials, such as concrete. Power tools are used to penetrate the floor above the conductive material. It is important that the power tool does not penetrate the conductive material, since this may result in numerous electrical hazards including harmful and possibly fatal electrical shocks to the equipment operator. Therefore, it is essential that the power tool is equipped with a safety device that discontinues equipment operation upon contact with any hidden conductive material.

SUMMARY OF THE INVENTION

An objective of the present invention is to provide an electrical safety device for power tools where an electrical circuit is completed when the power tool makes contact with a conductive material, thereby energizing a disconnect relay coil that automatically discontinues operation of the tool. Another objective of the present invention is to provide an electrical safety device for power tools where a reset relay coil can be energized by means of a push button, thereby allowing the tool to be reactivated quickly and easily once there is no longer any contact between the tool and the conductive material. A further objective of the present invention is to provide a remote reset switch for convenience and added efficiency of operation. The reset buttons are circuited to prevent the operator from holding the button to bypass the safety device. Finally, an objective of the present invention is to provide a device that offers protection to the equipment operator as well as protection against damage to hidden raceway, pipes, or other conductive materials.

DETAILED DESCRIPTION OF THE PREFERRED EMBODIMENT

Figure 1:
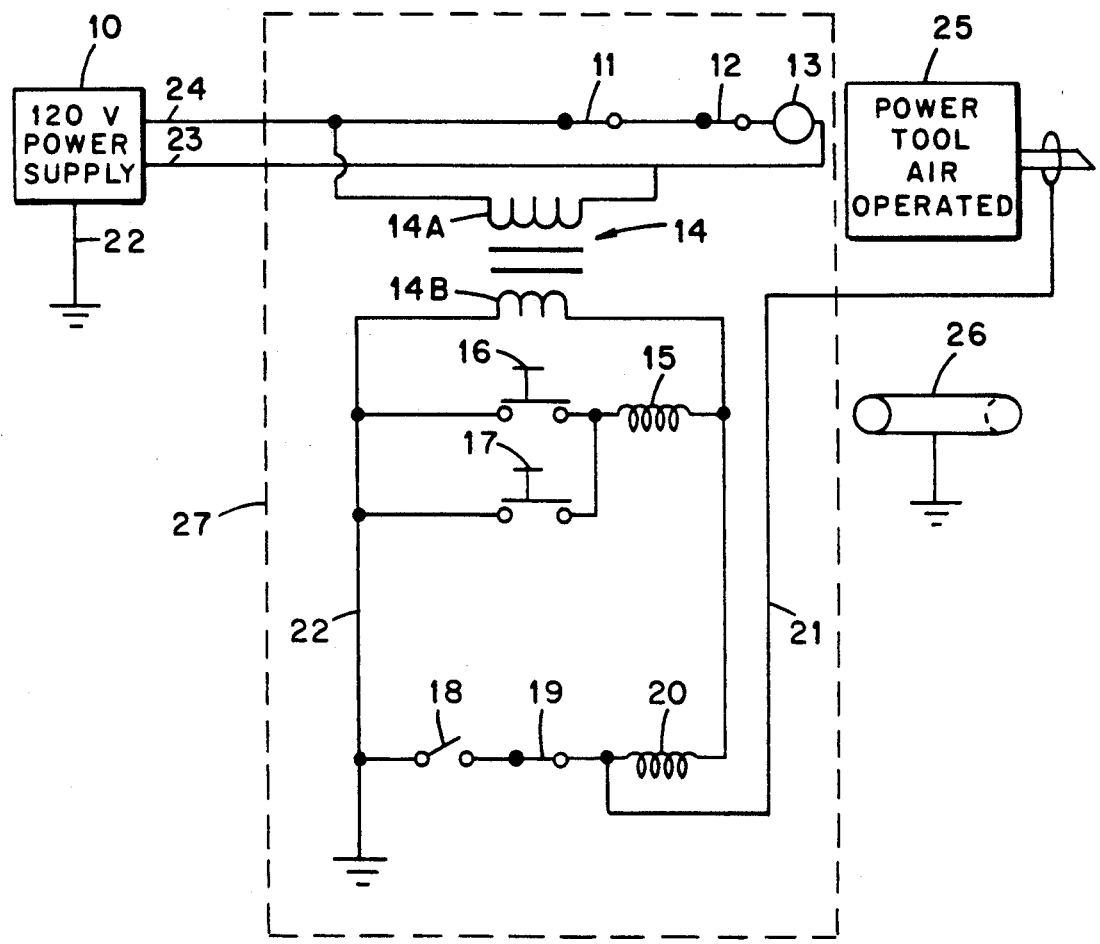
FIG. 1 shows an electrical safety device for power tools according to the present invention.

The present invention is directed to an electrical safety device for power tools where the safety circuit is activated when the power tool makes contact with a conductive material. The safety circuit of the present invention is only for use in conjunction with a jack hammer, which is an air compression power tool used in penetrating concrete floors. It is to be understood that the present invention cannot be used in conjunction with any power tool which is powered by electricity, only those that are air powered.

The safety circuit proposed by the present invention is shown in FIG. 1. Power can be supplied to the power tool 25, i.e., a jack hammer, through three conductors of a 120 VAC or other suitable power supply 10. The conductors can consist of a hot wire 24, a neutral wire 23, and a ground wire 22. A step-down transformer 14 can be used to supply the operating power for the safety circuit 27. The primary winding 14A of the transformer 14 can be connected to the hot wire 24 and the neutral wire 23 of the power supply 10. One side of the secondary winding 14B can be connected to a building ground 22. The reset relay 15 can have a pair of contacts 12 and 19. Similarly, the disconnect relay 20 can have a pair of contacts 11 and 18. The output of the reset relay 15 can be connected to building ground 22 through a momentary-contact switch or push-button 16. The output of the disconnect relay 20 can be connected directly to the power tool 25 by a grounding wire 21 and to building ground 22 through relay contacts 18 and 19.

Having set forth the apparatus which can be used in the present invention, a typical operation of the present invention will now be described. During normal operation, relay contacts 11 and 12 are closed and power can be passed to the jack hammer 25 through an air solenoid valve 13 that can be utilized to control the power tool (i.e., jack hammer) 25 in this example. When the power tool 25 makes contact with a conductive material 26, an electrical circuit is completed through the grounding wire 21 to the jack hammer 25, energizing the disconnect relay coil 20. Once the current flow energizes the disconnect relay coil 20, relay contact 11 opens cutting off the power to the power tool 25 thus automatically discontinuing its operation. At the same time, relay contact 18 closes allowing the output from the disconnect relay 20 to pass to building ground 22, thereby maintaining current flow through the disconnect relay 20. Also, when the safety circuit is activated, the air solenoid valve 13 is no longer energized and the air supply to the power tool (jack hammer) 25 is electrically interrupted. The equipment operator can then reposition the jack hammer or similar power tool.

Once there is no longer any contact between the jack hammer or power tool 25 and the conductive material 26, the jack hammer or power tool 25 can be reactivated by the reset relay 15. The reset relay coil 15 can be energized by depressing a push button or momentary-contact switch 16. When the reset relay coil 15 is energized by current flow, relay contacts 12 and 19 open momentarily. When relay contact 19 opens, the disconnect relay coil 20 can no longer be energized and relay contact 18 opens while relay contact 11 closes returning power to the jack hammer or power tool 25 through relay contacts 11 and 12, and the air solenoid valve 13. The reset relay 15 can also be activated by a remote reset switch 17 provided for convenience and efficiency of operation.

The present invention proposes a straight-forward design for an electrical safety device for power tools that automatically discontinues operation of the power tool just as it makes contact with a conductive material. The safety device as described herein will prevent damage to any concealed conductive materials such as raceways, pipes, etc. This device also provides greater protection to equipment operators against harmful or fatal electrical shocks. The use of a second relay coil to reactivate the equipment through a push button, and remote push button eliminates delays in operation.

I claim:

1. An electrical safety device comprising:

a transformer having a primary winding connected to a power supply and a secondary winding connected to a power input side of a first and second relay means and to a building ground, said first relay means for discontinuing operation of a power tool having a first contact normally closed and connected to a power lead of said power supply, a second contact normally open and connected to said building ground, a first side connected to said secondary winding of said transformer, and a second side connected to said power tool through a grounding wire and to said building ground through said second contact, said second relay means for reactivating said operation of said power tool having a first contact normally closed and connected between said first contact of said first relay means and said power supply a second contact normally closed and connected between said second contact of said first relay means and said second side of said first relay means, a first side connected to said secondary winding of said transformer, and a second side connected to said building ground through a momentary contact switch, means for completing an electrical circuit through said grounding wire when said power tool makes contact with a conductive material, whereby said first relay means is energized and said first contact thereof is opened and said second contact thereof is closed, so that operation of said power tool is discontinued by cutting off power thereto and output from said first relay means passes to said building ground, and means for reactivating said power tool by depressing said momentary-contact switch, whereby said second relay means is energized and said first and second contacts thereof are momentarily opened, so that said first relay means is de-energized and said first contact thereof is closed and said second contact thereof is opened for returning power to said power tool.

2. An electrical safety device as claimed in claim 1, wherein said power tool is a jack hammer.

3. An electrical safety device as claimed in claim 2, wherein an air solenoid valve is used to control the operation of said jack hammer.

4. An electrical safety device as claimed in claim 1, wherein said transformer is a step-down transformer.

5. An electrical safety device as claimed in claim 1, wherein said second relay means for reactivating said power tool is energized by a remote momentary-contact switch.

* * * * *